March 20, 1962 F. P. COTY 3,026,186
CATALYTIC APPARATUS
Filed Feb. 19, 1957 2 Sheets-Sheet 2
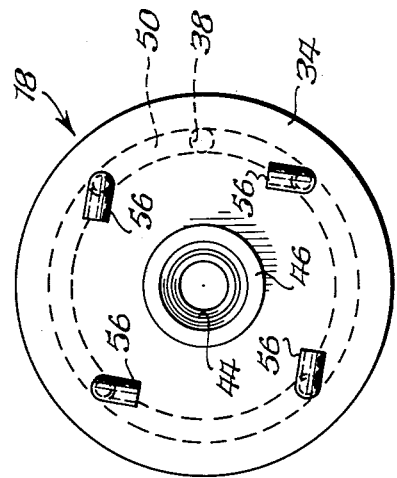
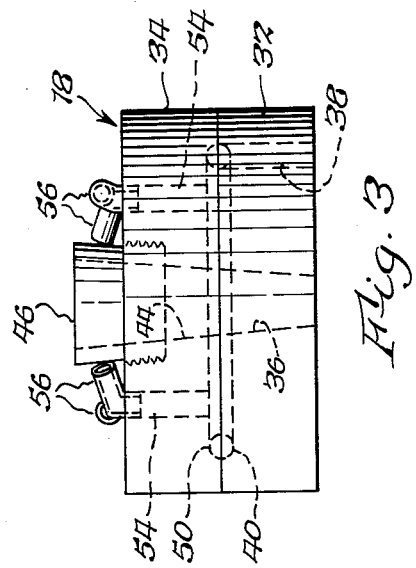
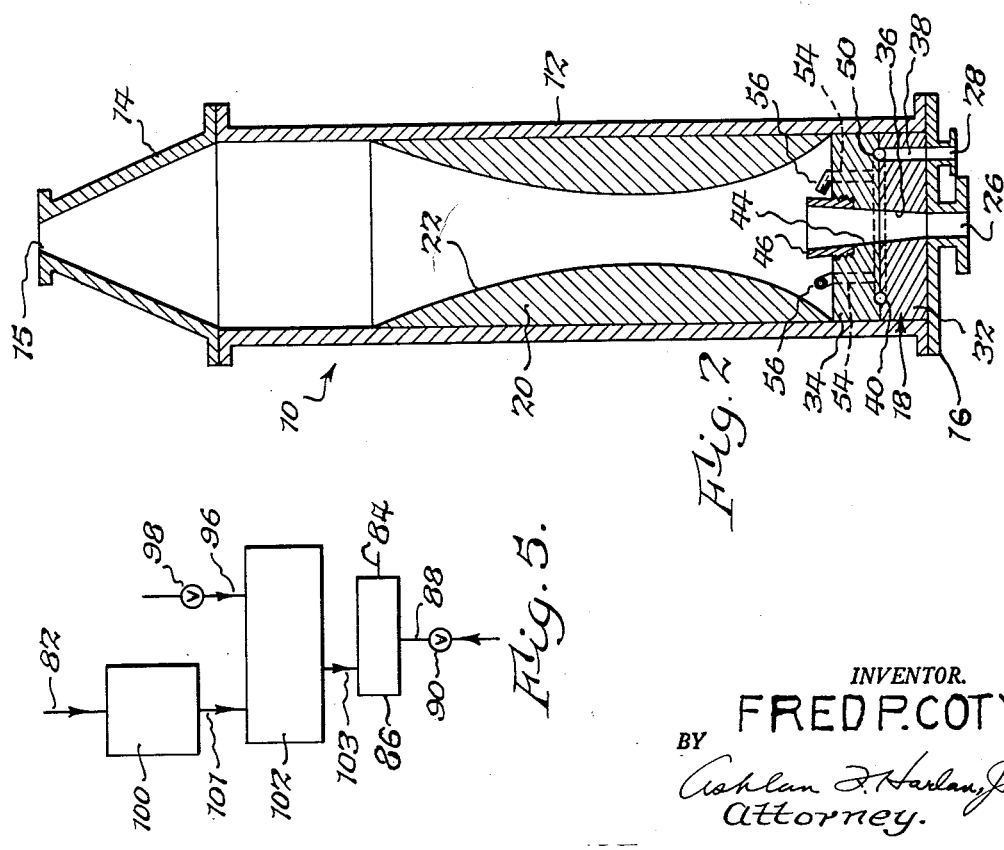
INVENTOR.
FRED P. COTY
BY
Ashlan D. Harlan, Jr.
Attorney.

United States Patent Office 3,026,186
Patented Mar. 20, 1962

3,026,186
CATALYTIC APPARATUS
Fred P. Coty, 1830 Snowden Ave., Long Beach, Calif.;
Anne Coty, as administratrix of the estate of Fred P.
Coty, deceased
Filed Feb. 19, 1957, Ser. No. 641,065
12 Claims. (Cl. 23—288)

This invention relates to catalytic apparatus and catalytic processes and is particularly concerned with such apparatus and processes in which a fluidized catalyst bed is employed.

It is an object of the invention to provide a catalytic reactor of novel design.

Another object of the invention is to provide a catalytic reactor in which increased efficiency is obtained with fluidized catalysts.

A further object of the invention is to provide a novel system for carrying out catalytic reactions.

Still another object of the invention is to provide a process for carrying out catalytic reactions with increased efficiency.

Catalytic reactions with gases or vapors have in recent years been frequently carried out in vertical reactors utilizing catalyst beds which are so agitated by the flow of the gas or vapor that the particles of catalyst are separated one from another by the gaseous fluid and as a result the bed as a whole has the mobility and hydrostatic pressure characteristics of a fluid. Fluidized catalyst beds are advantageous in many cases because of the ease with which uniform temperatures may be maintained even in deep beds, the high reaction rates possible because of the large specific surface of the fluidized catalyst particles, and the turbulence which tends to ensure contact of all of the gas or vapor with catalyst. In many installations for fluidized catalyst reactions it has, however, been difficult to obtain an even distribution of gaseous fluid throughout the cross-section of the reactor and as a consequence "channeling," i.e. the establishment of flow paths in the bed through which a disproportionate quantity of the introduced gas or vapor passes, or "slugging," a condition in which pockets or bubbles of gas or vapor grow to the diameter of the containing vessel and move catalyst particles trapped against adjacent bubbles upward in a piston-like fashion, are often encountered.

By the present invention there is provided a reactor for fluidized bed, catalytic reactions in which the flow of gas or vapor (hereinafter called generally "gaseous fluid") is so controlled and directed that the difficulties mentioned above are substantially eliminated. At the same time, no resort need be had to devices such as baffles which have in some cases been used in previous reactors in an attempt to stabilize the bed. It has been found that baffles do not in all cases prevent the difficulties they are intended to prevent although they usually greatly decrease the efficiency of the reactor in which they are used.

There is shown in the accompanying drawings a catalytic reactor of novel design intended for use with a fluidized catalyst bed and a system in which the reactor may be employed.

FIGURE 2 is an enlarged, vertical, sectional view of the reactor included in the system illustrated in FIGURE 1;

FIGURE 3 is a further enlarged, side elevation of the distributing header employed in the reactor shown in FIGURE 2;

FIGURE 4 is a top plan view of the header shown in FIGURE 3; and

FIGURE 5 is a fragmentary schematic illustration of a modification of the system illustrated in FIGURE 1.

Figure 1:
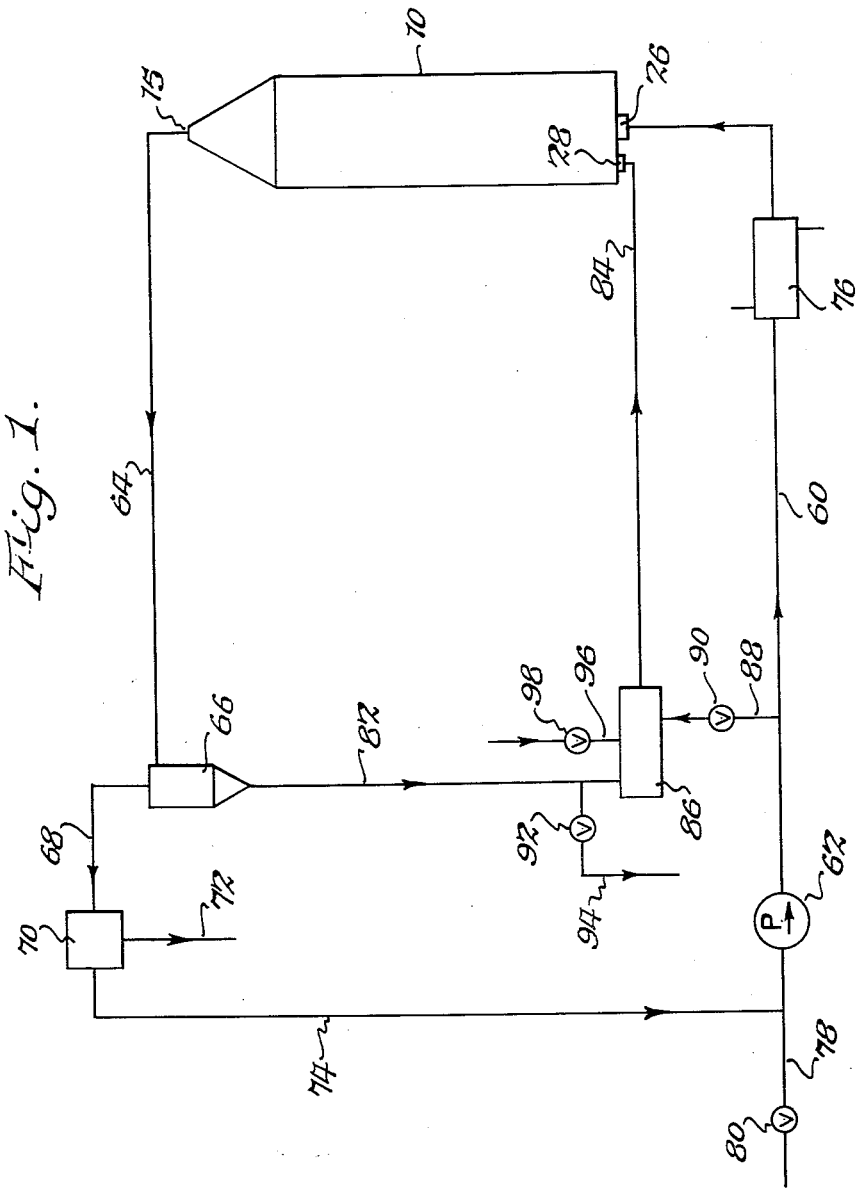
FIGURE 1 is a diagrammatic illustration of a novel system for catalytic reactions.

Referring to FIGURE 2, the numeral 10 indicates a reactor embodying the principles of the present invention. The reactor 10 comprises a vertically disposed, cylindrical shell 12 having a conical cap 14 with an outlet 15 and a bottom plate 16. Within the shell 12 at the bottom thereof there is provided a horizontally split sleeve 18 which forms a header. Above the header in the shell 12 is a tubular liner 20 of substantially the same diameter as the interior of said shell and having the passage 22 therethrough shaped as a venturi. The bottom plate 16 which may be secured to the peripheral bottom flange of the shell 12 by clamps or bolts (not shown) is provided with a central, main, fluid inlet passage 26 and a smaller, auxiliary, inlet passage 28 radially disposed with respect to the passage 26.

The lower part 32 of the header formed by the split sleeve 18 is provided with an axial passage 36 registering with the main inlet 26 in the bottom plate 16 and a passage 38 registering with the auxiliary inlet 28 in the bottom plate. In its upper face the header section 32 is provided with an annular groove 40 with which the passage 38 communicates.

The upper header section 34 is provided with an axial passage 44 that registers with the passage 36 in the lower header section 32 so as to form a continuous bore or conduit through the header. At its upper end the passage 44 is enlarged and interiorly threaded to receive the exteriorly threaded main nozzle 46. There is also provided in the upper header section 34 an annular groove 50 which, when the sections are assembled, cooperates with the groove 40 in the lower section to provide an annular passage. This passage may be of any desired cross section determined by the shapes of the grooves 40 and 50.

Extending upwardly from the groove 50 and communicating therewith are a plurality of parallel bores or passages 54. Adjacent the upper face of the header section 34 the passages 54 are interiorly threaded and a nozzle 56 is threadedly engaged in each of the passages. As best shown in FIGURE 4 the auxiliary nozzles 56 are spaced radially from the nozzle 46 and are arranged angularly with respect to radii of the header, their outlets being so directed that materials introduced through them into the lower end of the reactor 10 are caused to swirl and follow a circular or spiral path.

The reactor 10 described above may be used in carrying out a large number of different catalytic reactions when incorporated in a suitable system with the necessary auxiliary equipment and controls. Its construction is such that it increases the efficiency of the reaction and process by permitting the collection of fine particles of catalyst which are carried off in the outgoing stream of the gaseous fluid and the return of such fine particles to the reactor, thus prolonging the useful life of the catalyst charge. At the same time, it permits the even distribution of returned particles of catalyst and of new catalyst particles in the reaction bed so as to prevent clinkering and blocking of the bed. Furthermore, it provides for an efficient distribution of the feed gases to the fluidized bed with consequent reduction in the tendency toward channeling and slugging.

In FIGURE 1 there is illustrated diagrammatically a system adapted for carrying out various catalytic reactions that embodies a novel reactor according to the present invention. In the illustrated system the reacting materials as gases or vapors (gaseous fluids) are conducted to the main inlet 26 of the reactor 10 through the line 60. The necessary pressure to cause flow of the gaseous fluid feed and produce a fluidized catalyst bed in the reactor is provided by the pump 62. The line 64 leading from the outlet 15 at the top of the reactor 10 carries the reaction products and unreacted feed material from the reactor to a separator 66 in which entrained catalyst particles are removed from the gaseous fluid.

The mixture of reaction product and unreacted feed material is led from the separator 66 through the line 68 to another separator 70 in which the reaction product is condensed or removed in other convenient and suitable manner. The reaction product may be carried to storage or point of use by the line 72. The unreacted feed materials pass from the separator 70 through the line 74 to the inlet of the pump 62 and are fed back under pressure to the reactor 10 through the line 60. A heating device 76, which may be of any design required to increase the temperature of the reacting materials to the desired point, is located in the line 60 between the pump 62 and the main inlet 26 of the reactor. Additional reactive feed materials may be supplied to the system through the line 78 which also is connected to the inlet of the pump 62. Admission of such materials may be controlled by the valve 80.

Fine catalyst particles removed from the gaseous fluid stream in the separator 66 are returned to the reactor 10. This may be conveniently accomplished with an injector 86, fluid reacting materials supplied thereto by the line 88, controlled by valve 90, carrying the recovered catalyst through the lines 82 and 84 to the auxiliary inlet 28 of the reactor. For the purpose hereinafter described catalyst may be withdrawn from the system through the valve 92 and the line 94. Also additional catalyst may, when desired, be fed into the injector 86 through the line 96, entrance of such additional catalyst being controlled by the valve 98. Alternatively, instead of the injector 86, a screw conveyor (not shown) or other suitable device may be used to move catalyst to the auxiliary inlet 28.

FIGURE 5 illustrates schematically a modification of the system shown in FIGURE 1. In this modification the numeral 100 designates apparatus for rejuvenation or other treatment of the recovered catalyst fines. The fines after such treatment are fed through the line 101 to a storage chamber or bin 102 into which fresh catalyst may also be fed through the line 96. After mixing, if desired, the catalyst is fed to the injector 86 through the line 103. As stated above other appropriate feeding devices may, if desired, be substituted for the injector 86.

Reactors constructed in accordance with the present invention may be employed in carrying out a large number of reactions. Synthesis reactions such as those employed in the making of acrylonitrile and vinyl acetate may be carried out by supplying to the reactor the necessary reacting materials and having in the reactor a suitable catalyst. Catalytically, aided reactions such as hydrogenation, alkylation and polymerization may also be advantageously carried out in a reactor embodying the novel features of the present invention. Further, such reactors can be used in reactions that involve catalytic decomposition such as dehydrochlorination and cracking of hydrocarbons. In the following example the use of a reactor in accordance with the present invention for synthesizing acrylonitrile is described.

*Example*

The reactor 10 is charged with a suitable catalyst, such, for example, as granular charcoal impregnated with potassium cyanide or sodium cyanide. A mixture of acetylene and hydrogen cyanide is then admitted to the reactor through the lines 78 and 60, the gases being heated in the heat exchanger 76 to a temperature of approximately 500° C. The gases enter the reactor through the main inlet 26 and the nozzle 46 at the mouth of the venturi-shaped passage through the liner 20 and pass upwardly through the catalyst bed which, because of the flow of gases and the shape of the passage 22, is maintained in a fluidized state suspended in the passage. Sufficient catalyst is charged to provide a bed of such depth under operating conditions as to extend from the throat of the venturi-shaped passage 22 to a point above the top of the liner 20 but below the top of the reactor. Inert gas may be and usually is mixed with the hydrogen cyanide and acetylene to control the vigor of the catalytic reaction and permit maintenance of the temperature in the catalyst bed within the range from about 500° C. to 600° C. The acrylonitrile formed, together with the unreacted hydrogen cyanide and acetylene and any inert gas present, pass from the reactor through the outlet 15 and line 64 to the separator 66. This separator is preferably of the centrifugal type and removes from the gaseous effluent the fine particles of catalyst which have been carried out of the reactor therewith. From the separator 66 the gases are conducted to the second separator 70 in which the acrylonitrile is condensed and separated from the unreacted hydrogen cyanide and acetylene. The product can then be purified by known methods. The unreacted gases are carried through the line 74 to the pump 62, with additional reacting materials being admitted through the line 78 and forced by the pump 62 through the heat exchanger 76 to re-enter the reactor through the main inlet 26. At the same time the catalyst recovered in the separator 66 is fed back to the axially offset reactor inlet 28 through the lines 82, 84 in the manner described hereinabove. This recycling process may be continued indefinitely so that production can be continuous.

In carrying out the process described above, a reactor capable of holding approximately 400–500 lbs. of catalyst is preferred. It is also preferred to use a wide range of particle size distribution for the catalyst. A particle size range of from 80–130 mesh is generally satisfactory. The reactive materials are preferably fed to the reactor with the acetylene in considerable excess, a ratio of acetylene to hydrogen cyanide from 3.4:1 to 3.8:1 producing good results. The feed of the gaseous reacting materials to the reactor will be dependent to a considerable extent upon the size of the reactor, the amount of catalyst therein and the particle size and shape of the catalyst particles. In general, however, inlet velocities of from 0.50 to 1.0 feet per second may be used. In some cases considerably higher velocities will be satisfactory, as for example when it is desired to change the catalyst in the reactor at a faster rate.

From time to time, usually at periods of from four to eight hours, a small amount of the catalyst is withdrawn from the system through the valve 92 and line 94 and additional catalyst is supplied through the line 96. This tends to maintain the efficiency of the catalyst within the reactor. Moreover, since the relatively finer particles are carried over with the effluent gases, the periodic withdrawal and replacement of catalyst prevents the catalyst bed from containing too high a percentage of very fine particles. It will be evident that complete replacement of the catalyst bed will thus occur over a period of time so that the efficiency of the process is maintained. Of course other suitable catalysts may be employed instead of the cyanide impregnated charcoal in synthesizing acrylonitrile and obviously other catalysts will be required for other reactions and processes.

It will be understood that the operation of the system illustrated in FIGURE 1 will be much the same as that described above in carrying out other catalytic processes although in the use of the system for specific processes, some modification or additions may be required. Thus, for example, in a process in which the catalyst becomes inactive but can be regenerated the catalyst recovered in the separator 66 may be passed through a suitable regenerating apparatus to make it suitable for reuse in the reactor. In such case the provision of a catalyst storage unit directly in series with the regeneration apparatus and the catalyst feeding apparatus will also be of advantage. It will also be understood that if necessary cooling means may be provided in or around the reactor to prevent the development of excessive heat where exothermic reactions are being carried out. On the other hand, where necessary, any of the lines or pieces of apparatus included in the system as illustrated or described may be jacketed or provided with heating means to prevent premature condensation of either reaction products or of circulating reacting materials.

Although, as pointed out above, for particular types of catalytic processes certain modifications of or additions to the system illustrated in FIGURE 1 may be necessary or desirable, it will be clear that the novel process of this application essentially involves the use of the novel reactor, illustrated in FIGURE 2 and hereindescribed, in a system in which reacting materials are recirculated through the reactor and catalyst is drawn off with the effluent materials from the reactor, separated, and returned to the reactor in such manner as to produce an even distribution thereof throughout the catalyst bed.

As will be seen from the description of the novel reactor illustrated in FIGURES 2–4, such a reactor provides means for producing a suspension of catalyst in a fluidized state in which the tendency toward channeling or slugging is minimized because of the even flow of incoming gaseous fluid which is maintained. Moreover, the returned catalyst is admitted at a plurality of points around the circumference of the reactor chamber and is drawn upward into the catalyst bed as a result of the reduced pressure existing in the venturi-shaped passage 22.

Any suitable materials may be employed for constructing the novel reactor of the present invention and the other elements or components of the system in which it is used. In general, obviously, non-corrosive materials will be preferred and portions subject to wear, such as the liner 22, will preferably be so constructed as to facilitate their removal and replacement. For example, the shell 12 of the reactor 10 may conveniently be formed of steel, preferably stainless, while the removable lining 22 may be of graphite as may also be the sleeve 18 and nozzles 46 and 56.

It will be understood that the apparatus described and shown is in part exemplary only and that various modifications and variations may be made therein without departing from the spirit of the invention. Also, of course, when used for carrying out other processes additional apparatus, of known kinds, may be required.

I claim:

1. Apparatus for catalytic reactions which comprises a vertically disposed, tubular shell, a bottom for said shell, said bottom having a main inlet and an auxiliary inlet, a cover for said shell, said cover having an outlet, a header in said shell adjacent said bottom, a liner in said shell above said header, said liner extending for a major portion of the height of said shell and having a venturi-shaped pasage longitudinally therethrough, said header having an axial bore aligned with said main inlet and said passage and having a main nozzle communicating with said bore and extending into said passage and a plurality of auxiliary nozzles communicating with said auxiliary inlet and spaced radially from said main nozzle, said auxiliary nozzles having their outlets directed angularly with respect to radii of said header whereby materials introduced through said auxiliary nozzles into the lower end of said passage are caused to swirl substantially.

2. Apparatus for catalytic reactions which comprises a vertically disposed, tubular shell, a bottom for said shell, said bottom being provided with a main inlet and an auxiliary inlet, a cover for said shell, said cover being provided with an outlet, a header in said shell adjacent said bottom, a liner in said shell above said header, said liner extending for a major portion of the height of said shell and having a venturi-shaped passage longitudinally therethrough, said header having an axial bore aligned with said main inlet and said passage and having a main nozzle communicating with said bore and extending into said passage and an auxiliary nozzle radially spaced from said main nozzle and communicating with said auxiliary inlet.

3. Apparatus for catalytic reactions which comprises a vertically disposed, tubular shell, a bottom for said shell, a cover for said shell, said bottom and said cover being provided, respectively, with an inlet and an outlet, a sleeve within said shell adjacent said bottom, said sleeve having an axial bore, a liner in said shell above said sleeve, said liner being of substantially the same diameter as the interior of said shell and extending for a major portion of the height of said shell and having a venturi-shaped passage longitudinally therethrough and said inlet, said bore, and said passage being axially aligned.

4. Apparatus for carrying out catalytic reactions which comprises a vertically disposed, tubular shell having a bottom and a cover, said bottom and cover being, respectively, provided with an inlet and an outlet, and a liner in said shell of substantially the same diameter as the interior of said shell, said liner extending for a major portion of the height of said shell and having a venturi-shaped passage longitudinally therethrough, said inlet and said passage being axially aligned.

5. Apparatus for carrying out catalytic reactions which comprises in combination a vertically disposed, tubular shell having a bottom and a cover, said bottom and cover being, respectively, provided with a main inlet and with an outlet, and a venturi-shaped passage extending longitudinally of said shell and aligned with said inlet, said inlet and said outlet communicating solely through said passage.

6. A system for catalytic reactions involving the use of particulate catalysts which comprises a vertically disposed, tubular reactor, said reactor having a main inlet at the bottom thereof, an auxiliary inlet adjacent said main inlet, an outlet at the top thereof, and a venturi-shaped passage therethrough aligned with said main inlet and in communication with said inlets and said outlet, means connected to said outlet for removing reaction products, unreacted feed and catalyst fines from said reactor, means for separating said fines from said reaction products, means communicating with said auxiliary inlet for returning said fines to said reactor, said last-mentioned means including means for supplying fresh particulate catalyst to said reactor and means, within said reactor, for introducing said fines and said fresh catalyst into said passage at points radially spaced from said main inlet and adjacent thereto.

7. A system as set forth in claim 6 in which means is provided for separating said unreacted feed from said reaction product and returning it to said main inlet.

8. A system for catalytic reactions involving the use of particulate catalysts which comprises a vertically disposed reactor for enclosing a bed of particulate catalyst, said reactor having a main inlet at the bottom thereof, an auxiliary inlet adjacent said main inlet and an outlet at the top thereof, means for supplying a feed of reactive gaseous fluids to said main inlet, means connected to said outlet for removing reaction products and catalyst fines from said reactor, means for separating said fines from said reaction products and means for returning said fines to said auxiliary inlet, said auxiliary inlet being at the bottom of said reactor.

9. A system as set forth in claim 8 in which means is provided for removing a portion of said fines from the system and for supplying fresh particulate catalyst to said auxiliary inlet.

10. A system as set forth in claim 8 in which means is provided for separating unreacted feed material from said reaction products and returning said feed material to said main inlet.

11. A system as set forth in claim 9 in which said reactor is provided with a venturi-shaped passage therethrough, said passage being aligned with and in communication with said main inlet, and means in communication with said auxiliary inlet for introducing catalysts into said passage at points radially spaced from said main inlet and adjacent thereto.

12. Apparatus for carrying out catalytic reactions which comprises a vertically disposed, tubular shell having a bottom, a main inlet in said bottom and an auxiliary inlet in said bottom radially spaced from said main inlet, a liner in said shell of substantially the same diameter as said shell and extending for a major portion of the height thereof, said liner having a venturi-shaped passage longitudinally therethrough, said main inlet and said passage being axially aligned and said main inlet having a nozzle extending into said passage, and means in said shell providing communication between said auxiliary inlet and a plurality of points within said passage and radially spaced from said main inlet.

References Cited in the file of this patent

UNITED STATES PATENTS

| | | |
|---|---|---|
| 1,869,949 | Stzikla | Aug. 2, 1932 |
| 2,311,140 | Totzek | Feb. 16, 1943 |
| 2,374,518 | Wolh | Apr. 24, 1945 |
| 2,381,119 | Dill | Aug. 7, 1945 |
| 2,558,746 | Gaucher | July 3, 1951 |
| 2,572,829 | Atkinson | Oct. 30, 1951 |
| 2,606,097 | Goodson | Aug. 5, 1952 |
| 2,657,124 | Gaucher | Oct. 27, 1953 |
| 2,719,112 | Kearby et al. | Sept. 27, 1955 |

FOREIGN PATENTS

| | | |
|---|---|---|
| 763,369 | Great Britain | Dec. 12, 1956 |